United States Patent [19]

Benkert

[11] 4,291,525

[45] Sep. 29, 1981

[54] ROTARY CROP HARVESTER WITH RAPIDLY REPLACEABLE PARTS

[76] Inventor: Donald E. Benkert, 1234 Blair Ave., South Pasadena, Calif. 91030

[21] Appl. No.: 170,937

[22] Filed: Jul. 21, 1980

[51] Int. Cl.³ .......................................... A01D 45/00
[52] U.S. Cl. ............................. 56/327 R; 56/328 R; 171/56
[58] Field of Search .......... 56/327 R, 328, 55, 121.42; 171/56, 58

[56] References Cited

U.S. PATENT DOCUMENTS

| | | | |
|---|---|---|---|
| 1,719,871 | 7/1929 | Burts | 171/56 |
| 2,202,433 | 5/1940 | Schumacher | 171/56 |
| 3,461,967 | 8/1969 | Wells | 171/58 |
| 3,548,950 | 12/1970 | Phelan | 171/56 |
| 4,236,581 | 12/1980 | Beckett | 56/121.42 |

*Primary Examiner*—Robert A. Hafer

*Attorney, Agent, or Firm*—Wm. Jacquet Gribble

[57] ABSTRACT

A rotatable wheel on a mobile frame carries radially extending pairs of movable, opposed crop-gripping arms which are spring-loaded toward each other. Brackets on each face of the wheel pivotably secure the arms. A roller on each arm moves onto and out of engagement with a cam on the frame with each rotation of the wheel, opening and closing the arms. Preferably the brackets, springs and rollers have quickly defeasible attachment hardward for ease in replacing worn parts, like a readily accessible removable pin securing each arm spring in a cavity in the arm, and rollers having shafts with indents in which a spring-loaded lock removably lodges. In one embodiment a lone threaded member secures each bracket and also affords a base locator for the arm spring. A bracket is removable with arms still attached for ease in maintenance with access to the threaded member through the spring cavity.

12 Claims, 14 Drawing Figures

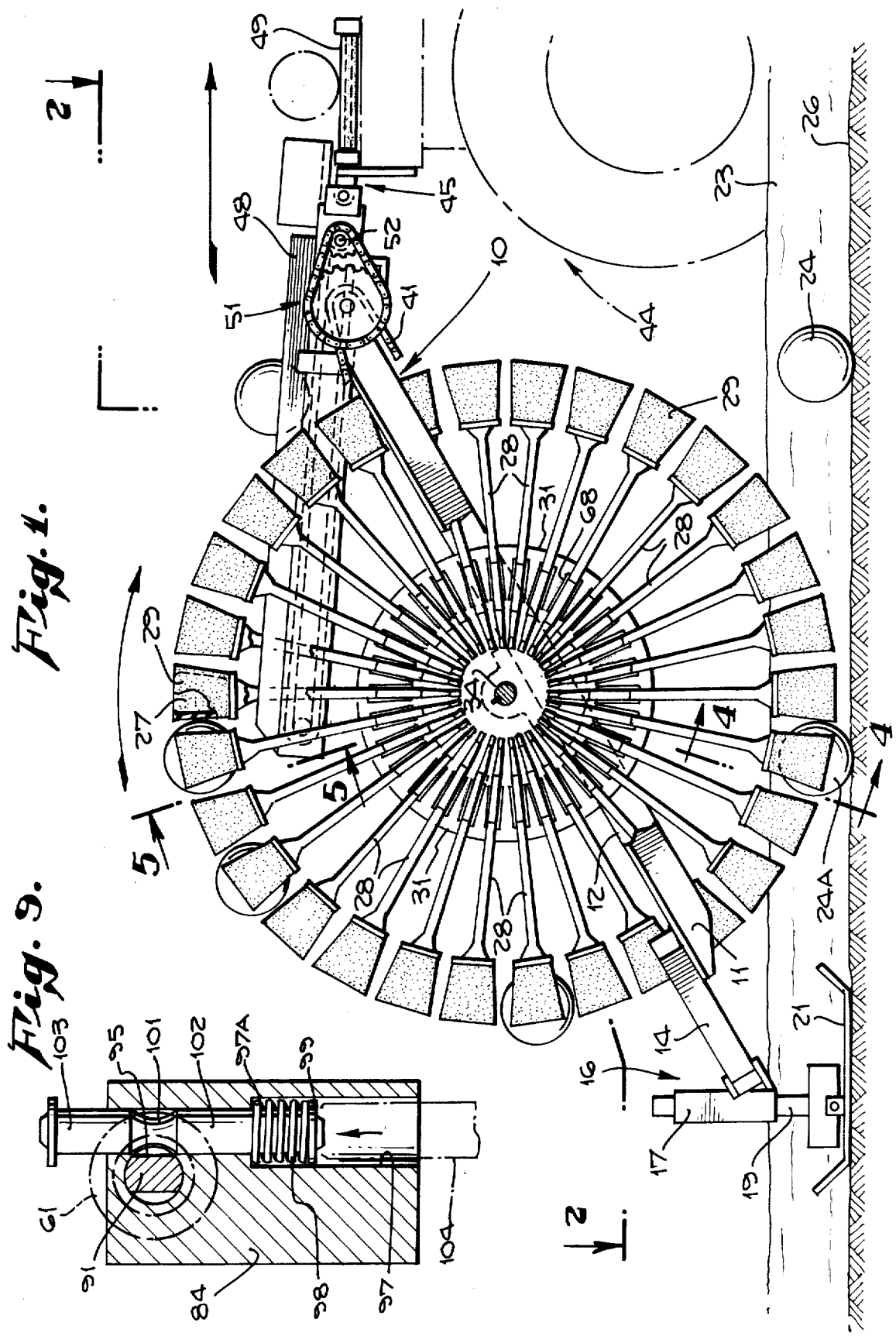

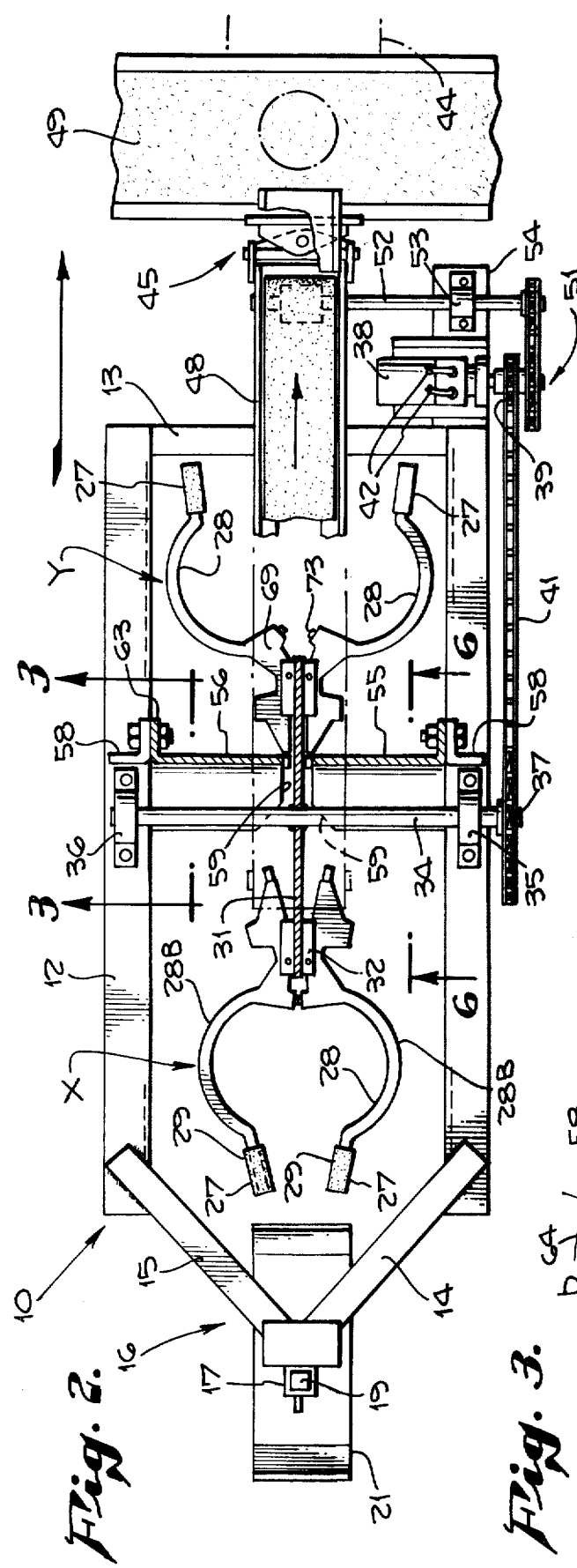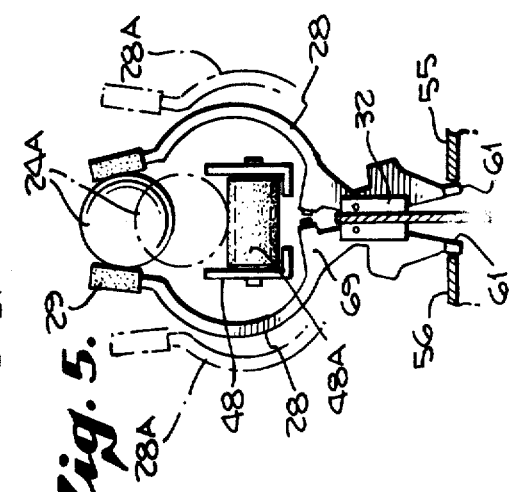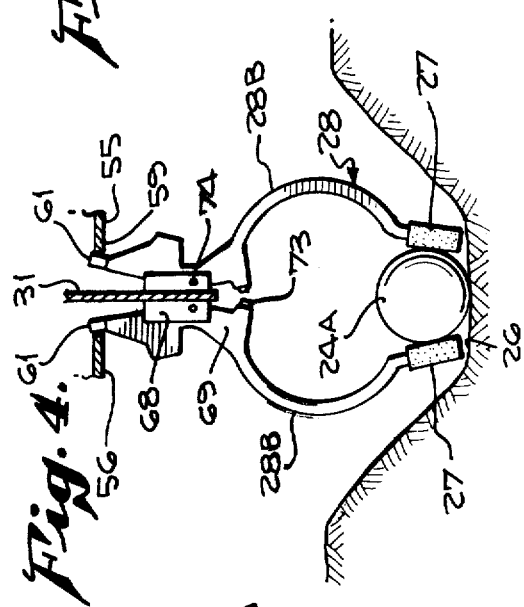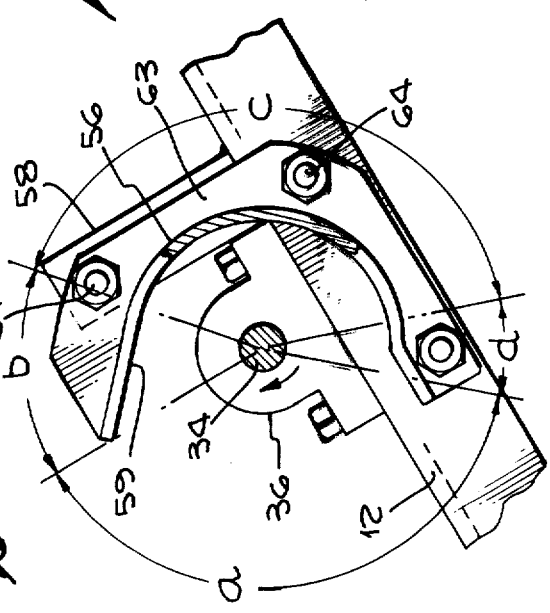

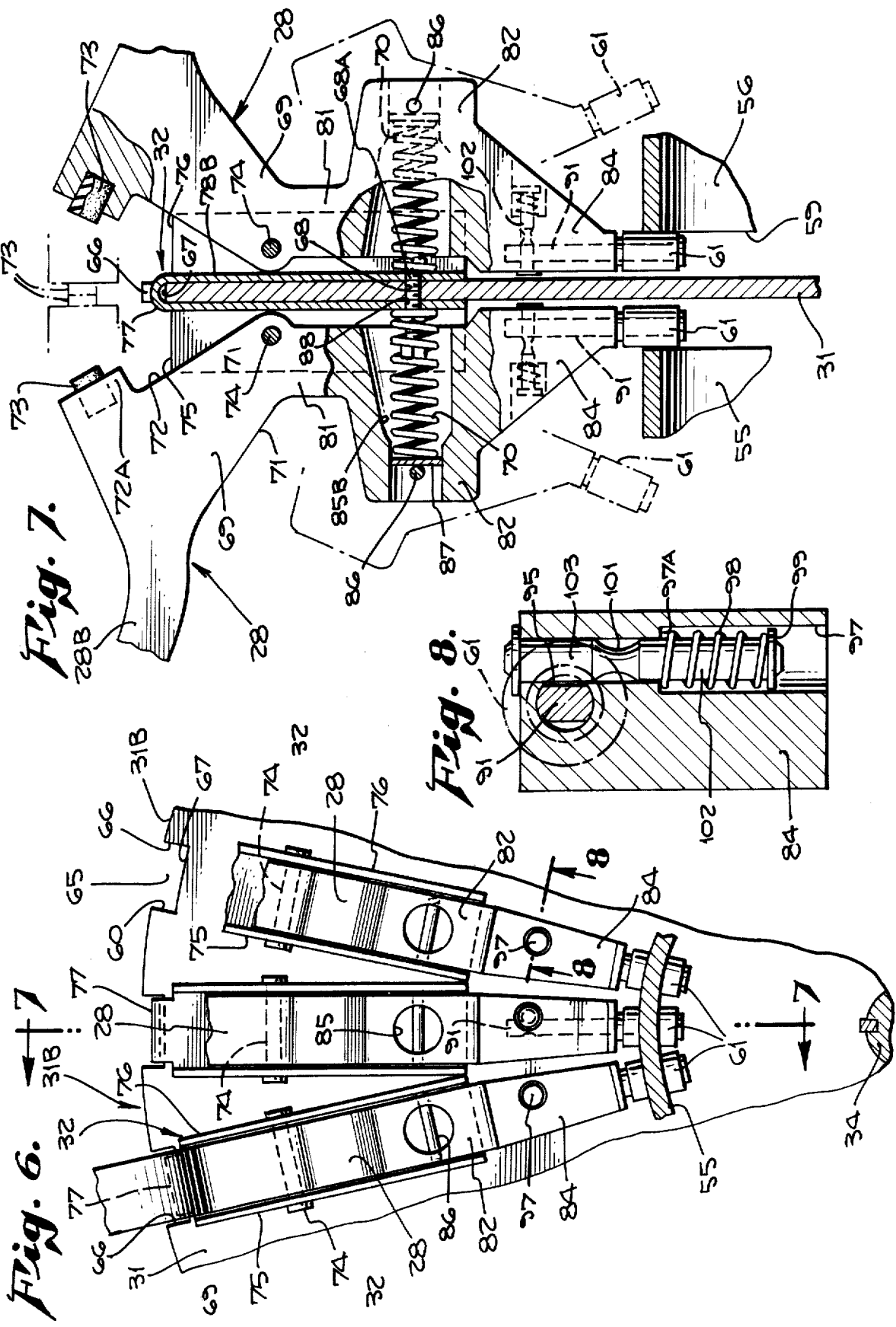

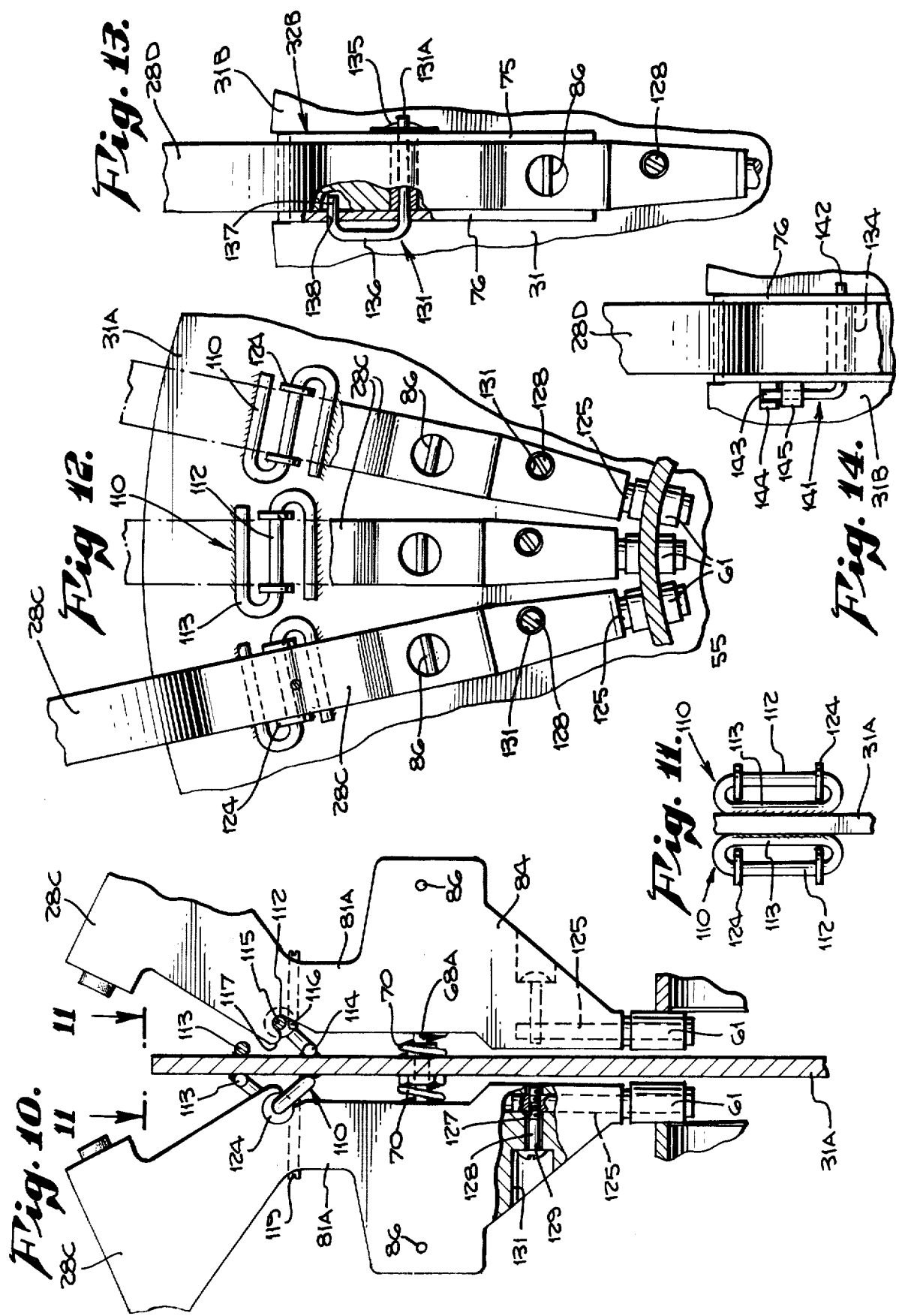

ROTARY CROP HARVESTER WITH RAPIDLY REPLACEABLE PARTS

BACKGROUND OF THE INVENTION

The invention relates to crop harvesters and more particularly to harvesters for row crops like melons, squashes and similar large fruits and vegetables. Early attempts to solve the problems attendant mechanical harvesting are exemplified by U.S. Pat. No. 1,719,871 issued July 9, 1929 to R. D. Burts, entitled "Harvester for Peanuts and other Plants." The Burts harvester and other similar devices operate in open fields in an atmosphere of abrasive particles sent aloft from the soil of the cultivated field by the activities of the harvester itself. Harvesters are conventionally used in gangs along with mobile conveying and scheduled trucks which accompany the harvester-conveyor in the field. Dirt and dust from the soil is abrasive and quickly wears moving parts. With the harvesting devices having a multitude of moving parts, repairs are often necessary, and it is desirable to have a harvester with the capability of being rapidly repaired to cut costs and to minimize down time.

In row harvesting the produce may be hand picked from several adjacent rows and the selected produce distributed in furrows along which the harvesters are operable. Therefore, the frequency of the produce in a furrow may be greater than normal growing distribution. Adjacent pick-up pairs of arms of the harvester must be closely spaced so as to gather most, if not all, of the produce in a furrow without repeated passes along the furrow. Raising the produce with the harvester arms from the furrow to a conveyor must not damage the produce, so the gripping hands of the pick-up arms must be firm without crushing the produce or marring its exterior. Since produce is not normally uniform in size and weight the arms need to accommodate a significant range of size and weight. Previous devices have been unable to achieve all of these parameters in a harvester, and have missed produce, marred the produce and broken down frequently from friction wear and have also been costly to repair and down frequently.

A critical efficiency factor in rotary wheel harvesters is the space between pick-up arm pairs as the arms sequence through the pick-up cycle as stated above. Since the available space for any mechanism diminishes as the radial arms approach the center of wheel rotation, it is essential that the mechanism of the arm be very small near the hub such that a multiplicity of arms may fit around the powered wheel. One of the factors in determining the number of arms needed is the average size of the produce being harvested. Size determines the needed chord extent of the gripping portion, or "hand" of the arm, and therefore the extreme circumferential size of the pick-up wheel assembly. The extreme wheel diameter is limited by the space between wheel and arm tips necessary for the take-off conveyor and the height of the conveyor or receiving bin apparatus associated with the harvester. The number of arm pairs for a given wheel is largely determined by these parameters, and the distance from the wheel center to the arm pivot is a factor of the chord width of the pivoting mount for the pick-up arms. Therefore, the optimum harvester has a pivot mechanism and mounting apparatus that allows a minimum chord expanse at the arm pivot which is also easily attached or removed because of the large number of arms required.

BRIEF STATEMENT OF THE INVENTION

The invention contemplates, in a harvester having a mobile frame carrying a powered wheel with a plurality of pairs of opposed pick-up arms, each with an actuating roller adapted to contact one of a pair of mirror image cams, the combination including means securing the cams to the frame and pivot brackets on the wheel for the pick-up arm pairs. Preferably the brackets are such that the arms are secured detachably to the powered wheel. A compression spring housed in each arm biases the arm toward the other arm of the pair. The spring is spaced from the arm pivot of the pivot bracket radially of the wheel and removable securing means retains each of the compression springs. Each of the actuating cam rollers is removably secured to an arm and is removable when the rollers are out of contact with the cams. A preferred embodiment of the invention includes means for securing each pivot bracket to the wheel in releasable fashion so that a bracket may be removed from the wheel with the pick-up arm pair attached to the bracket.

The preferred embodiment further includes a roller shaft housed in the rotary pick-up arm, a recess in the periphery of the shaft and a transverse lock removably engaged with the recess in the shaft. Means that selectively may be overcome biases the lock into engagement with the peripheral recess in the shaft. The pivot bracket is shaped such that bracket flanges extend away from the wheel face when the bracket is secured to the wheel. The flanges may be narrow so that the chord expanse of the bracket is not materially increased by the flanges. A bent band connects bracket portions on each wheel face. Registry notches in the wheel rim in which the bent bands seat and bracket securing means locate the brackets about the wheel with preciseness such that adjacent pairs of pick-up arms clear each other in operation. With the rollers being easily removable and replaceable, and the brackets and pick-up arm springs also being replaceable in simple fashion, the harvester of the invention is capable of being repaired quickly. Since the rollers, shafts, pivots, brackets and arms bear the brunt of abrasive wear, the harvester of the invention may be kept in operation and the down time for repairs appreciably diminished when compared with other harvesters of this type.

These and other advantages of the invention are apparent from the following detailed description and drawing.

BRIEF DESCRIPTION OF THE DRAWING

FIG. 1 is a side elevational view, partly broken away, of a preferred embodiment of the invention shown in operation in a field;

FIG. 2 is a sectional plan view, partly broken away, of the harvester of FIG. 1, taken along line 2—2 of FIG. 1;

FIG. 3 is a sectional view taken along line 3—3 of FIG. 2;

FIG. 4 is a fragmentary transverse sectional elevational view taken along line 4—4 of FIG. 1 at the point of produce pick-up;

FIG. 5 is a fragmentary transverse sectional elevational view taken along line 5—5 of FIG. 1 at the produce discharge stage;

FIG. 6 is a fragmentary side elevational view of the pivot brackets and rollers of the preferred harvester taken along line 6—6 of FIG. 2;

FIG. 7 is a fragmentary transverse sectional elevational view taken along line 7—7 of FIG. 6;

FIG. 8 is a roller shaft lock sectional detail view to larger scale and taken along line 8—8 of FIG. 7;

FIG. 9 is a sectional view similar to FIG. 8 showing the release position for the roller shaft;

FIG. 10 is a fragmentary side elevational view of an alternate rotary pick-up arm pivot bracket;

FIG. 11 is a fragmentary plan view of the bracket of FIG. 10;

FIG. 12 is a fragmentary side elevational view of the pivot brackets of the embodiment of FIG. 10 in place on the powered wheel;

FIG. 13 is a fragmentary side elevational view illustrating a further alternate pick-up arm pivot embodiment; and FIG. 14 is a fragmentary side elevational view of a further alternate embodiment of a pick-up arm pivot.

DESCRIPTION OF THE PREFERRED EMBODIMENTS

In the various views like parts are identified by like reference characters.

The general layout of the harvester of the invention is apparent from FIGS. 1 and 2. A frame 10 has longitudinal side rails 11, 12, a front rail 13 tying between the side rails, and trailing rear connectors 14, 15. The rails and connectors may be of angle iron. In plan (FIG. 2) frame 10 is largely rectangular, with a tapering rear portion 16 where connectors 14, 15 join to a vertical sleeve 17 which is adjustable vertically with respect to a pillar 19 fixed to a small, broad skid 21. A pneumatic tired wheel may replace the skid.

Skid 21 rides on the bottom of the furrows, which, in the case of melon harvesting, are generally contoured before and after planting as one of a plurality of parallel rows. One such row 23, is shown in FIG. 1 with produce such as melons 24, 24A, resting on bottom 26 of the furrow. The furrows are conventionally on about eighty inch centers and may be from eight to twelve inches deep, depending upon crop and field conditions.

The furrows are conventional irrigation ditches with beds between ditches, the furrows having sloping sides from a top width of about twentysix inches to a minimum bottom width of about six inches. The bed is therefore about fortyfour inches wide, leaving sufficient growing room for the crop so that cultivating trimming of vines that extend into the furrow may be done without harm to the crop. Further data on melon growing, an illustrative crop for the harvester of the invention, may be found in the periodical "Publications of the A S A E" Vol. 18, No. 5, pages 803 and following. As pointed out in that article, walls of furrows are sloped to the center so produce placed in or located in the furrow tends to roll to the furrow center to afford the harvester a narrower transverse distribution of produce on pick-up approach.

Pick-up contact with the produce in the furrow is made one at a time by hands 27 of a plurality of rotary pick-up arms 28 that have a cushioning mitten on each pick-up arm hand. A harvester for melons may have thirty pairs of arms, the chordal spacing of the hands being determined by the average produce diameter anticipated for harvest. The hands are spatulate and mittens 29 are fixed to them conveniently, as by suitable adhesive. Each arm 28 extends radially from a disk or wheel 31 to terminate in a hand. Arms are secured to the wheel in opposed pairs, each pair pivoting upon a dual bracket 32 releasably secured in turn to both faces of wheel 31. In a harvester such as the one shown herein, adapted to harvest melons like cantaloupes, the pick-up wheel assembly may have an outer diameter approximating four feet with hands having a chordal width of four inches.

The wheel is fixed to a transverse axle 34 that extends across frame 10 and is journalled at each end in bearing mounts 35, 36 that are fixed to side rails 11, 12 of the frame. An outboard sprocket 37 on axle 34 is driven by a hydraulic motor 38 by means of a drive sprocket 39 and a sprocket chain 41. The hydraulic motor is conventionally linked by hydraulic lines 42 to the prime mover for the harvester, whether the prime mover is a tractor or a self-powered mobile conveyor assembly, either of which is conventionally equipped with a hydraulic pump which can supply fluid under pressure to motor 38. The hydraulic lines are shown fragmentarily, with the prime mover 44 being shown in broken lines in FIG. 1. The tow linkage between the prime mover and the inventive harvester is indicated at 45 in FIGS. 1 and 2. The linkage is representative only and varies with the type of prime mover, but typically provides for upward rotation of the harvester, by apparatus not shown, to allow easy harvester transport.

A discharge conveyor 48 slopes from the vertical center of the wheel toward the prime mover and discharges into a bin or conveyor 49. If a conveyor is used to move produce across the furrows from the harvester, discharge is into an attendant truck which departs to a packing plant when loaded and a scheduled empty truck becomes the attendant truck.

A sprocket and chain assembly 51 links between a hydraulic motor 38 and a conveyor drive shaft 52 which is journalled by a bearing block 53 mounted on a rail extension 54, as is the hydraulic motor 38.

As can be seen in the sectional plan view of FIG. 2, a pair of mirror opposed cams 55, 56 are fixed to the side rails of the frame, 11 and 12 respectively. The cams are semi-cylindrical in configuration, as can be seen from FIG. 3, and each is supported on a vertical angle iron 58 fixed, as by welding, to the respective side rail and extending toward wheel 31. Each cam 55, 56 has a shaped cam surface 59, the extent of which is shown in FIG. 3. In FIG. 3 the open or closed conditions of the opposed pick-up arm pairs are shown as arcs about shaft 34 of the pick-up arm wheel. The zone "a" is the arc through which the arms traverse with the arms "closed" upon a produce unit, such as the melon 24A shown in FIG. 1. In the arc zone "b" the cam induces the arms of a pair to start parting, releasing the grasped produce onto the belt 48A of conveyor 48. In arc zone "c" the arms are held at maximum "open" position as shown in FIG. 2 at position "Y" and, in this position produce units are completely released and the arms are capable of clearing conveyor 48 as the arms continue their arcuate travel. During arc "d" the arms begin to close and are free to close against the produce in a furrow from the end of arc "d" through the previously described arc "a".

As can be seen in FIG. 4, arms 28 are closed upon a melon 24A and the cam rollers 61 of each arm are out of contact with the contoured cam surface 59 of each cam. The melon 24A grasped by the pick-up arms in FIG. 4 is shown at the nadir of pick-up arc "d" and the cam rollers of the arms having substantially completed arc "d", prior to traverse of the arc "a", the full closed region. Zenith discharge position of the arms shown in arms 28A of FIG. 5, occurs within arc "b" roller position, wherein melon 24A is released from the pick-up arms and deposited on conveyor 48A of conveyor 48. The 28A arms position of FIG. 5, full open, occurs when the rollers are in "c" region. Since the cam contours are mirror images of one another the arms move in dimensional symmetry with respect to the plane of rotation of wheel 31 so that alignment of the arms with furrow is constant. Balanced springs center the produce with respect to the conveyor for efficient discharge.

The relationship between the pick-up arm cam rollers and the mirrored cams is such that contact by the attached cam rollers on one of the mirrored cams, which is shaped to release rapidly pick-up arm pairs, substantially at nadir tangency with the circumferential extremities of the hands and the ground to enable spring-bias forces, which are greater for larger produce, as required for heavier loads, and lesser for smaller produce, and as satisfactory for lighter loads, to function as need dictates to grasp the produce for circumferential transport, grasped by hand pairs of the arms through void space previously occupied by produce behind the wheel, and upward as the wheel rotates about its axis, which advances with the harvester toward uncollected produce. Continued pick-up wheel rotation causes roller contact with the associated cam when the pick-up arm hand is near zenith, causing hands separation, which drops smaller sized produce on the conveyor 48 for transport to other conveyances or bins. Gradual sloped shape of the mirrored cams and the agency of roller contact minimizes torque loads imposed on the pick-up arm pivots and successively results in full spreading of hand pairs on the arms and the attendant release of maximum size produce to allow arms and hands to clear the conveyor and position the hands in full open posture prior to nadir release from the cam contact to grasp any particular sized produce within the confines of the rapidly closing hands as they advance with the harvester over manually positioned produce in the furrow being worked. The speed of the pick-up wheel axis advancing toward un-elevated produce is substantially equal to or less than the tangential speed of the hands on the ends of the pick-up arms.

Since the thrust against the cams by the spring-loaded pick-up arms is transmitted to the frame, the cams each have a shaped end flange 63 by which the cam thrust is transmitted both to the vertical angle irons 58 and to the rails themselves, the flange being secured to the angle iron and the rails by a plurality of bolts such as the bolts 64 shown in FIG. 3. As can be seen from FIG. 1, it is possible for several pick-up arm pairs to traverse the nadir point of the furrow without encountering any produce at the point of closure of the pair if the spacing between produce units is as indicated in that Figure. Frequently the produce is lined up in impinging contact like pearls on a wavy string. The spacing therefore may vary in accordance with the density of the crop and with the random placement by workers transferring produce from vine to the selected furrow. Not every arm pair advancing from nadir tangency to the furrow to zenith position in the traverse of the pick-up wheel about axle 34 will have grasped produce. Therefore, the hands and the mittens 27, 29, respectively, of the pick-up arms will traverse arc "a" of the cam sequence in the position "X" of FIG. 2, which is the nominally closed attitude of the hands when not spaced apart by a produce unit. As mentioned previously, the harvester works normally in an abrasive environment, resulting from frequent elevation of dirt lumps which often break up and fall into the wear points of rollers, shafts, arms, pivots and brackets. The harvester must, therefore, be constructed for easy repair and part replacement. In addition, the configuration of the pick-up arms must accommodate to the diminishing arcuate or chord dimension of the wheel as the wheel center is approached. In FIGS. 6 and 7 further details of the arms and the arm mounting means are illustrated. FIG. 6 shows a peripheral rim 31B of the pick-up wheel with notches 65 with radial walls 66 spaced apart circumferentially, and the chord wall 67. The notches are precisely located about the periphery of the pick-up wheel in precise radial alignment with circumferentially equally spaced holes 68 in the wheel. The notches and holes cooperate to register properly the doubled pivot bracket 32 which attaches a pair of pick-up arms 28 to wheel 31. Each hole 68 mounts a spring screw 68A about which opposed compression springs 70 reside. The compression springs 70 both act to close the opposed pick-up arms to grasp produce in a furrow and are overcome by roller contact with the cam surfaces to release and receive the produce. The doubled bracket 32 secures pick-up arms on both faces of wheel 31 as shown in FIG. 7, wherein each arm 28 can be seen to extend outward of wheel rim 31B. The extension is an outwardly curving section 28B which terminates in the spatulate hand 27 as best seen in FIGS. 2, 4 and 5.

The root of each curved portion of an arm is an arm wedge 69 having an outwardly sloping wall 71 and an inward wall 72 spaced from wall 71 and divergent thereto. Stop cushions 73 for each arm are housed in a protruding wedge portion 72A and preclude contact on closing between hands of an arm pair. Chordal pivot pins 74, which in some cases may be conventional rivets, extend through the wedge portion of each pick-up arm from spaced, parallel flanges 75, 76 of doubled bracket 32 wherein the pins are journalled. Each doubled bracket has been described as registered in a circumferential notch 65 of wheel 31, registry being effected by a semi-circular web segment 77 connecting flanged bracket webs 78A and 78B. Segment 77 is unflanged so that it may seat in a notch 65 and contact radial notch walls 66 for registry.

In each pick-up arm 28 a narrow neck portion 81 connects between wedge portion 69 and a spring housing 82. The spring housing extends away from pivot bracket 32 arcuately of the wheel. The housing tapers radially inwardly to a roller shaft housing 84. Housing 84 also diminishes in chordal width as the arm extends away from the pivot pin 74, and the cam rollers 61 of each arm 28 extend from the arm end spaced from axis 34 of the pick-up wheel such that the roller of each arm makes contact with cam surface 59 of one of the mirror imaged cams 55, 56 in each revolution of the wheel. FIG. 7 shows rollers 61 in contact with cam surfaces 59 of cams 55 and 56.

The opposed compression springs 70 of a pick-up arm pair are shown in FIG. 7 within stepped cavities 85 of each spring housing 82. Each cavity comprises an outboard cylindrical bore 85A open to atmosphere and connected to a tapered step wall 85B which leads to an inboard expanding chamber 85C. The outboard bore houses a transverse thrust pin 86, which is removable, and a thrust washer 87 that bears against the pin, retaining spring 70 in the cavity about screw 68A. The screw passes through clearance hole 68 of wheel 31 and through aligned clearance holes 88 in the bracket webs 78A, 78B. Thin lock nuts 89 threadably engage screw 68A and secure the webs of bracket 32 to the wheel. The bracket is thus removably secured by the nuts in proper alignment on the wheel and the springs are removably secured by the pins 86.

The expanding cavity growing larger as it approaches the bearing seat for each spring which is defined by the lock nuts, provides for the rocking motion the springs must make with respect to the cavities to compensate for the movement of the pick-up arms about their chordal pivot points 74. Since the springs are radially inboard of the pivot pins, the springs bias the paired arms toward closing, as at position X of FIG. 2. The closing motion is limited by resilient cushions 73, defeated by an arc of cams 55, 56 and arrested by produce grasped by hands 27.

Each revolution of wheel 31 imposes a load upon each roller 61 of a pick-up arm and upon their journal shafts 91. It is therefore desirable from the standpoint of ready maintenance that the roller assemblies be easily replaced, since they are not only under repetitive strain but are also continuously subjected to an abrasive atmosphere. Therefore, each roller is releasably secured in its housing 84 by means of a spring-loaded transverse lock 94 engaging a flat 95 on roller shaft 91, locking the shaft in shaft hole 96 of the housing.

Lock 94 resides in a stepped bore 97 at right angles to the long axis of roller shaft 91. A lock spring 98 is compressed between a lock flange 99 and a bore shoulder 97A caused by the stepped bore. The lock 94 has a peripheral notch 101 separating the longitudinal extent of the transverse lock into a spring mandrel 102 and a latch barrel 103. The barrel is normally in registry with flat 95 of roller shaft 91, as shown in FIG. 8, locking the shaft and a roller 61 in place in housing 84. FIG. 9 shows the unlocked position achieved by a thrust tool 104, shown by broken lines, is pushed into bore 97 against lock flange 99 and displaces the lock in bore 97 such that lock notch 101 is in line with shaft flat 95, affording clearance which frees the shaft in shaft hole 96 for easy removal when the particular roller is out of contact with a cam.

Placement in the housing of a new roller and shaft is done in similar fashion by displacement of the transverse lock in hole 96.

The embodiment of FIGS. 1 through 9 described above is demonstrated to be easily maintained, either in the field or in the adjacent repair facility, as well as being effective in elevating produce from the furrow to the gathering conveyance. Similar advantages accrue to the embodiments of FIGS. 10 and 13, wherein different means for pivoting the paired pick-up arms with respect to the pick-up arm wheel and different lock means for securing the roller shafts are combined with the other elements of the disclosed apparatus. For instance, in the harvester of FIGS. 10 through 12 a pair of opposed pick-up arms 28C are similar in most respects to the pick-up arms 28 previously described. However, each of pick-up arms 28C is pivoted with respect to a pick-up arm wheel 31A by a bent wire pivot 110 which has a central axle 112 and transversely spaced support limbs 113, 114 which are parallel to the axle. Axle and limbs are of one piece. The limbs are fixed to the face of the wheel, one on each side, and welded in place on the wheel faces while held in a locator jig or fixture which precisely locates each pivot 110 with respect to the wheel axle 34 (not shown), circumferentially spaced to accommodate the needed plurality of arms on the wheel, and in proper chordal attitude with respect to the pivot axle portion.

Instead of clearance holes like the holes 68 of the previously described embodiment, each pick-up arm 28C has a pivot notch 115 adjacent the wheel face and opening toward the face. The notch is defined by an arm wall 116 extending transversely of neck 81A of the arm and a lip 117 protruding from the neck toward the wheel beyond wall 116. In addition, a set screw 119 threadably engaged in the neck of the arm extends outwardly beyond the neck in a tip 121 best seen in FIG. 10. Preferably each axle 112 includes spaced limit discs 124 that may be fixed to the axle and serve to locate the pick-up arm within the central portion of axle 112. The embodiment employs the same loading or compression spring combination as the prior embodiment and springs 70 of each arm, the transverse pins 86 and screws 68A are visible in FIG. 10.

Each roller 61 of a pick-up arm 28C has a roller shaft 125 which extends into roller housing 84 of the arm in a suitable bore. A threaded transverse bore 127 in each roller shaft accepts a lock bolt 128 which is threadably engaged in that transverse bore. The lock bolt is lodged in a hole 129 that extends through housing 84 and is counter-sunk in a cylindrical chamber 131 giving access to the lock bolt head from the exterior of the pick-up arm.

The embodiment of the invention shown in FIG. 10 may be assembled similarly to the assembly mode of the previously described embodiment and replacement of rollers, arms and springs is equally facile. Set screws 119, when retracted, do not interfere with removal of the pick-up arms from axles 112 of the bent wire pivots 110.

The embodiments of FIGS. 13 and 14 are similar to the embodiment of FIG. 1, in that pick-up arm wheel 31B has a plurality of circumferentially spaced doubled brackets like bracket 32B, each having spaced flanges 75, 76 in which pivot pins are secured to support the opposed pick-up arms of a pair. The embodiment of FIG. 13 has a "J"-shaped pin 131 which extends through an opening 133 in the neck 81 of pick-up arm 28D and is journalled therein in an bushing 134 in the opening. An end 131A of the pivot pin extends beyond flange 75 and is transversely secured in one direction by a threadless nut 135, which may be a Tinnerman type fastener. The opposite pin end is secured to flange 76 by a radially projecting leg 136 and a lock stem 137 that extends from leg 136 through the flange wall to register in an aperture 138 of the flange. The pivot pin is thus locked by stem 137 and nut 135 but is easily removed by disengaging nut 135 and displacing lock stem 137 from registry with aperture 138.

In some instances it may be preferable to use an "L"-shaped pivot pin as shown in FIG. 14 wherein a pivot pin 141 has an axle 142 and a lock leg 143. The lock leg is at right angles to the axle and is secured by frictional engagement with opposed, spaced, parallel tabs 144, 145 extending from flange 76. The tabs may be punched economically from the bracket flange wall. The pivot hole through pick-up arm 28D may be journalled with a bushing 134 as is the embodiment of FIG. 13. Rotation of the pick-up arm is thus about a fixed pivot pin on which the arm bushing rides.

In each of the described embodiments the harvester of the invention disclosed is capable of efficient elevation of gathered produce from field furrows to a harvest conveyor for further handling, and each embodiment affords rapid machine maintenance at low cost because of the disclosed combination of elements. The disclosure above is to be regarded as illustrative only. Other modifications than those shown within the scope of the invention may occur to those skilled in this particular art. It is therefore desired that the invention herein be measured by the appended claims rather than by the foregoing illustrative disclosure.

I claim:

1. In a rotary armed harvester for grasping produce having a mobile frame carrying a powered rotary wheel with a plurality of radially arrayed pairs of opposed pick-up arms each with an actuating roller adapted to contact one of a pair of mirror imaged cams, each arm being biased toward its opposing arm and alternatively forced away from its opposing arm by displacement of its attached actuating roller by one of said cams, the combination comprising means securing each of said cams to said frame, pivot brackets and chordal pivots on the powered wheel for the pick-up arms, means securing each bracket to the wheel, a spring on each arm adapted to bias a pick-up arm toward the opposing arm of a pair, said spring being spaced radially from the chordal pivot in the pivot bracket, removable securing means for each of said springs, and removable securing means for each of said actuating rollers operable when said rollers are out of contact with said cam.

2. Apparatus in accordance with claim 1 wherein each of said pivot brackets secures a pair of opposing pick-up arms with respect to the powered wheel.

3. Apparatus in accordance with claim 2 wherein the means securing each bracket to the wheel is releasable with respect to the wheel for removal of said pivot bracket from said wheel with said pick-up arm pair attached to said pivot bracket.

4. Apparatus in accordance with claim 2 wherein said roller removable securing means comprises a roller shaft housed in said rotating pick-up arm, and a transverse lock removably engaging said roller shaft.

5. Apparatus in accordance with claim 1 wherein said roller removable securing means comprises a roller shaft housed in said rotary pick-up arm, a recess in the periphery of said shaft, a transverse lock removably engaging said recess in said shaft periphery, and defeasible means biasing said lock into engagement with said peripheral recess.

6. Apparatus in accordance with claim 1 further comprising a resilient hand at an end of each pick-up arm remote from said chordal pivot.

7. Apparatus in accordance with claim 1 wherein said arm springs comprise compression springs and said removable securing means for each of said springs comprises a closed wall in said pick-up arm defining a spring cavity, an outward extension on said means securing each bracket to the powered wheel and adapted to position the base end of said compression spring, and removable means in said arm extending across said spring cavity inhibiting removal of said spring from said cavity and said arm and restraining said spring against said bracket so as to impose an arcuate moment on said pick-up arm.

8. Apparatus in accordance with claim 7 wherein said spring cavity increases in cross sectional area nearer the base end of said spring.

9. Apparatus in accordance with claim 1 wherein said pivot bracket comprises two connected parallel webs, one web at each side of said powered wheel, spaced flanges extending from each web on either side of the wheel in parallel relationship on both webs, and a chordal pivot for a pick-up arm extending between flanges on each web radially outboard of said springs.

10. Apparatus in accordance with claim 9 further comprising a plurality of indexing notches in the periphery of said wheel, and a connector portion between bracket webs adapted to lodge in said indexing notches to space said brackets on said power wheel.

11. Apparatus in accordance with claim 9 further comprising means securing said pivot non-rotatably between flanges of said pivot brackets.

12. Apparatus in accordance with claim 9 further comprising pivots in said pivot brackets having an anchor leg removably securing said pivot non-rotatably between flanges of said pivot brackets.

* * * * *